US007904349B1

(12) United States Patent
Hart et al.

(10) Patent No.: US 7,904,349 B1
(45) Date of Patent: Mar. 8, 2011

(54) METHOD AND APPARATUS FOR OBTAINING AND EDITING PRODUCT DESCRIPTIONS

(75) Inventors: Matt E. Hart, Lunenburg, MA (US); Steven Aldrich, Los Altos, CA (US); Kathleen Leacox, Carmichael, CA (US)

(73) Assignee: Intuit Inc., Mountain View, CA (US)

( * ) Notice: Subject to any disclaimer, the term of this patent is extended or adjusted under 35 U.S.C. 154(b) by 1171 days.

(21) Appl. No.: 11/551,856

(22) Filed: Oct. 23, 2006

(51) Int. Cl.
*G06F 17/30* (2006.01)
(52) U.S. Cl. ...................................... 705/27.1
(58) Field of Classification Search .............. 705/26, 705/27, 28, 27.1
See application file for complete search history.

(56) References Cited

U.S. PATENT DOCUMENTS

| 5,950,173 | A * | 9/1999 | Perkowski | 705/26 |
| 6,282,318 | B1 * | 8/2001 | Dietrich et al. | 382/209 |
| 6,418,441 | B1 * | 7/2002 | Call | 1/1 |
| 2002/0107761 | A1 * | 8/2002 | Kark et al. | 705/27 |
| 2005/0065981 | A1 * | 3/2005 | Blinn et al. | 707/104.1 |
| 2007/0156538 | A1 * | 7/2007 | Peter et al. | 705/26 |

OTHER PUBLICATIONS

Beckman, Mel, "Energize Your Web Site," Macworld, Oct. 1996, vol. 13, No. 10, p. 104-110.*

* cited by examiner

*Primary Examiner* — Amee A Shah
(74) *Attorney, Agent, or Firm* — Gunnison, McKay & Hodgson, L.L.P.; Philip McKay

(57) ABSTRACT

A method and apparatus for obtaining inventory item descriptions includes a process for obtaining inventory item descriptions whereby a product description database is provided and manufacturer's descriptions of products are obtained and stored in the product description database using the manufacturer's identification data as an identifier. Data from a computing system implemented financial management system used by a seller of the product is then accessed to perform a mapping between the seller's identification data for a selected product and the manufacturer's identification data for the product. The product description database is then searched using the mapped seller's identification data for the product and, when the manufacturer's description of the product is found, the manufacturer's description of the product is transferred to the seller for use, in whole or in part, as the seller's description of the product on a seller's website and/or in the seller's computing system implemented financial management system.

45 Claims, 5 Drawing Sheets

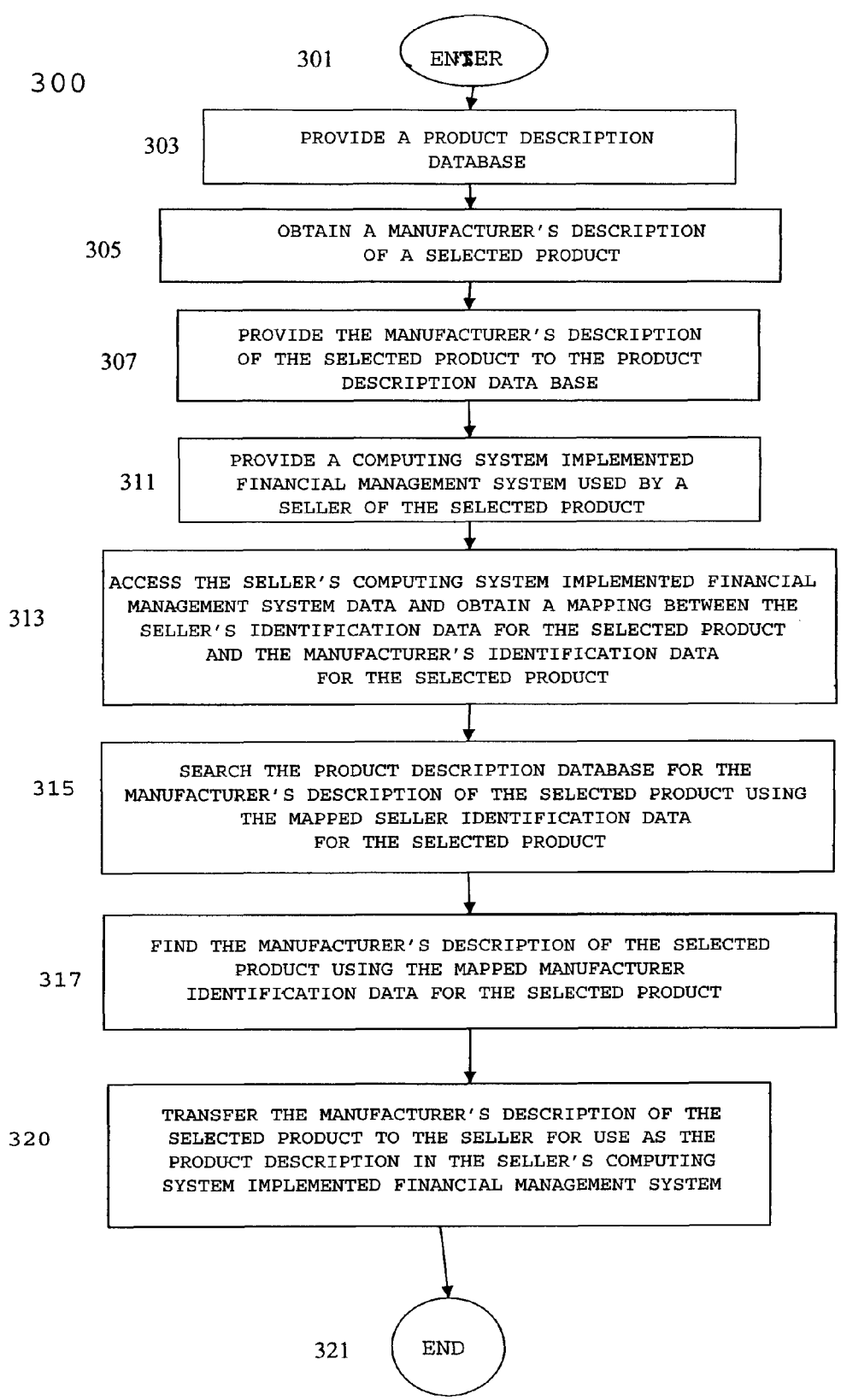

METHOD AND APPARATUS FOR OBTAINING AND EDITING PRODUCT DESCRIPTIONS

BACKGROUND

When more and more consumers turned to the Internet as their primary marketplace and purchasing mechanism, the pressure to maintain some sort of web presence was keenly felt by many sellers and, in response, many sellers raced to create a web presence for themselves. More recently, as the Internet has evolved into a primary source of product information and product research for the average consumer, many sellers now realize that a mere presence on the web is no longer sufficient and that customers expect a seller's website to include relatively detailed descriptions of inventory items/products offered, along with visual data such as photographic or video images of the products being offered.

A problem for sellers arises however because even small seller businesses can offer hundreds, thousands, or even tens of thousands of various inventory items. Consequently, providing an even modestly detailed description of each inventory item, not to mention photographic or video images of these inventory items, is a daunting task requiring, in many cases, far more time and resources than the seller can afford to invest. As a result, in many instances, providing photographic and video images of the inventory items is forgone completely, and the descriptions provided by the seller's are often rather light, at times inconsistent, or wrong, include various typos and other errors, and all too often are not very enlightening for the consumer. Consequently, in many cases, the sellers are not reaping the full potential benefits offered by the Internet and valuable opportunities to obtain customers and make sales are lost.

In addition to the sellers of a product, another party that has a vested interest in an Internet presence for its products is the manufacturer of the products. In many cases, manufacturers of products would like very much to ensure that their products are being displayed and described on the Internet in the most favorable light possible. In addition, many manufacturers have very detailed and informative descriptions of their products, as well as professionally developed photographic and video images, already prepared, and, in many cases, already residing on the manufacturer's website. However, currently, there is no easily implemented and readily available mechanism in place for a seller selling a manufacturer's products to obtain, and use, the manufacturer's descriptions and/or photographs and/or video images. This is due, in part, to: inconsistency in seller identification data for a product and the manufacturer's identification data for the product and an inability to map the seller's identification of a product to the manufacturer's identification of the product; inconsistency in data formatting; and lack of a centralized and coordinated process and/or repository. Consequently, currently, neither the seller of a product, nor the manufacture of the product, typically obtains the full benefit of the best available descriptions and/or photographs and/or video images of a given product.

SUMMARY

In accordance with one embodiment, a method and apparatus for obtaining inventory item descriptions includes a process for obtaining inventory item descriptions whereby a product description database is provided. In one embodiment, a manufacturer's description of a product is then obtained and provided to the product description database. In one embodiment, the manufacturer's description of the product is then, normalized, as discussed below, and stored using the manufacturer's identification data, such as UPC number, manufacturer part number, manufacturer product name, or any other manufacturer product identifier code and/or data as an index.

In one embodiment, data from a computing system implemented financial management system used by a seller of the product, such as, in one embodiment, data from a computing system implemented point of sale system, is then accessed to acquire data mapping the seller's identification data for the selected product, such as a UPC code, seller inventory number, seller catalog number, or seller product number with the manufacturer's identification data for the product discussed above. In one embodiment, the product description database is then searched using the mapped seller's identification data for the product. In one embodiment, when the manufacturer's description of the product is found, the manufacturer's description of the product is transferred to the seller for use, in whole or in part, as the seller's description of the product.

In addition, in one embodiment, the seller's identification, and/or website data, and/or location, and/or phone number, and/or other contact data is forwarded to the manufacturer so the manufacturer can list, or update, the seller's information in a retailers or "where-to-buy" listing section of the manufacturer's website.

In one embodiment, the product description database is a normalized database. As used herein, the term "normalized database" refers to a data base whose logical data model has been restructured to: standardize data formatting; eliminate redundancy, i.e., eliminate storing the same data in more than one table; organize data efficiently and ensure data dependencies make sense, i.e., only storing related data in a table; and reduce the potential for anomalies during data operations to improve data consistency and future enhancements. In contrast, a database that is not normalized is one that has not been broken down logically into smaller, more manageable tables and may include data that is contained in one or more different tables for no apparent reason.

In one embodiment, the product description database is a database linked to, associated with, and/or used by a search engine system. In one embodiment, the manufacturer's descriptions of their products, and/or the manufacturer product identification data, are obtained using a search engine to search manufacturers and/or third party websites on the Internet. In one embodiment, the manufacturer's descriptions of their products, and/or the manufacturer product identification data, are transferred, and/or otherwise provided to, the process for obtaining inventory item descriptions and/or the product description database by the manufacturers themselves.

In one embodiment, the seller's data from the computing system implemented financial management system is accessed by the process for obtaining inventory item descriptions via the seller permitting direct access to the data on the seller's computing system. In one embodiment, the seller's data from the computing system implemented financial management system is accessed when the seller uploads the data to the seller's website and/or when the seller is creating the website or modifying/adding listed inventory items. In one embodiment, the seller's data from the computing system implemented financial management system is transferred directly to the process for obtain inventory item descriptions and/or the product description database by the seller. In one embodiment, the seller's data from the computing system implemented financial management system is obtained, normalized and then stored.

In one embodiment, the manufacturer's description of the product is transferred to the seller, in whole or in part, to populate a product description field associated with the selected product on the seller's website. In one embodiment, the manufacturer's description of the product is transferred to the seller for use, in whole or in part, to populate the description of the product in the seller's computing system implemented financial management system.

In one embodiment, the seller is offered the opportunity to view the manufacturer's description of the product and then choose to import all, part of, or none of, the manufacturer's description of the product. In one embodiment, the seller is provided the opportunity to edit and/or use only part of the manufacturer's description of the product. In one embodiment, if the seller chooses to use only part of the manufacturer's description of the product, a link is provided on the seller's website listing of the product and, when activated, the link links the user to the full description of the product on either the product description database or the manufacturer's website. In one embodiment, if the seller chooses to use only part of the manufacturer's description of the product, the full description of the product is provided on the seller's website listing of the product as a PDF or similar downloadable and/or viewable document.

Using the method and apparatus for obtaining inventory item descriptions, and process for obtaining inventory item descriptions, disclosed herein, a seller can easily, and automatically, access a manufacturer description of a selected product the seller sells, including photographs and video, of inventory items for use as the description of the product on the seller's website and/or in the seller's computing system implemented financial management system. Consequently, using the method and apparatus for obtaining inventory item descriptions, and process for obtaining inventory item descriptions, disclosed herein, the seller is directly benefited by gaining access to often higher quality descriptions, photographs and video, of their inventory items/products, with little of no effort on the seller's part. At the same time, the product manufacturer is given the opportunity to widely, and uniformly, market their product and distribute descriptions and product data that are well produced, professional and consistent, and that the manufacturer feels will showcase their product in the most favorable terms.

In addition, in one embodiment, the seller's identification, and/or website data, and/or location, and/or phone number, and/or other contact data is forwarded to the manufacturer so the manufacturer can list, or update, the seller's information in a retailers or "where-to-buy" listing section of the manufacturer's website. This, in turn, benefits both the seller and the manufacturer by supplying more potential customers for the product.

In addition, as discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 3 is a flow chart depicting a process for obtaining inventory item descriptions in accordance with one embodiment;

Figure 1:
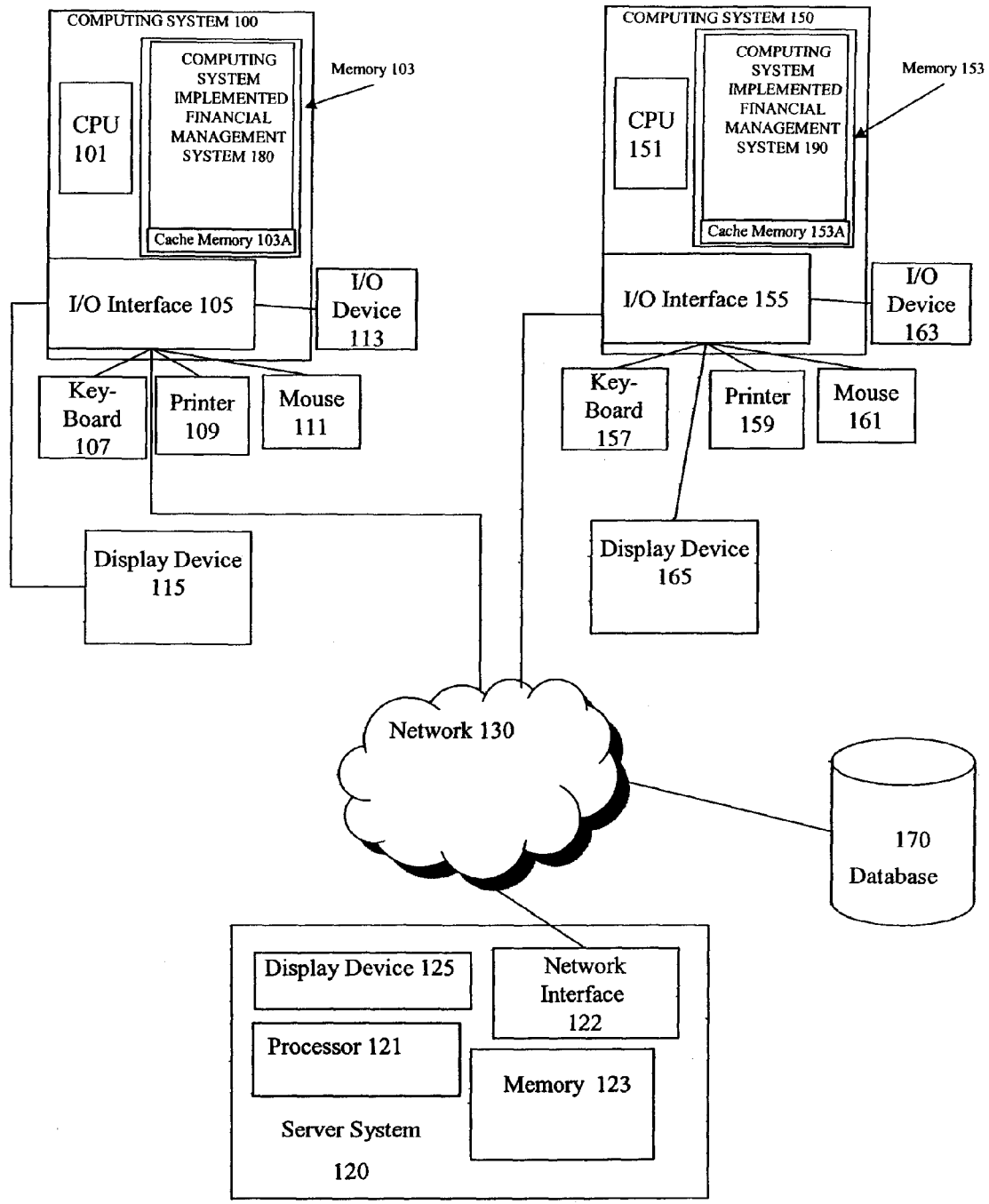
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and apparatus for obtaining inventory item descriptions includes a process for obtaining inventory item descriptions (200 in FIG. 2, 300 in FIGS. 3 and 400 in FIGS. 4A and 4B) whereby a product description database is provided. In one embodiment, a manufacturer's description of a selected product is then obtained and provided to the product description database. The manufacturer's description of the selected product is then, in one embodiment, normalized, and stored using the manufacturer's identification data, such as UPC number, manufacturer part number, manufacturer product name, or any other manufacturer product identifier code and/or data as an index.

In one embodiment, data from a computing system implemented financial management system used by a seller of the selected product, such as, in one embodiment, data from a computing system implemented point of sale system, a computing system implemented general business/inventory management system, and/or a computing system implemented accounting system, is then accessed by the process for obtaining inventory item descriptions to find data mapping the seller's identification data for the selected product, such as a UPC code, seller inventory number, seller catalog number, or seller product number to the manufacturer's identification data for the selected product discussed above. In one embodiment, the product description database is then searched using the mapped seller's identification data for the selected product. In one embodiment, when the manufacturer's description of the selected product is found, the manufacturer's description of the selected product is transferred to the seller for use, in whole or in part, as the seller's description of the selected product.

In addition, in one embodiment, the seller's identification, and/or website data, and/or location, and/or phone number, and/or other contact data is forwarded to the manufacturer so the manufacturer can list, or update, the seller's information in a retailers or "where-to-buy" listing section of the manufacturer's website.

In one embodiment, the product description database is a normalized database, as used herein, the term "normalized database" refers to a data base whose logical data model has been restructured to: standardize data formatting; eliminate redundancy, i.e., eliminate storing the same data in more than one table; organize data efficiently and ensure data dependencies make sense, i.e., only storing related data in a table; and reduce the potential for anomalies during data operations to improve data consistency and future enhancements. In contrast, a database that is not normalized is one that has not been broken down logically into smaller, more manageable tables and may include data that is contained in one or more different tables for no apparent reason.

In one embodiment, the product description database is a database linked to, associated with, and/or used by a search engine system. In one embodiment, the manufacturer's descriptions of their products, and/or the manufacturer product identification data, are obtained using a search engine to search manufacturers and/or third party websites on the Internet. In one embodiment, the manufacturer's descriptions of their products, and/or the manufacturer product identification data, are transferred, and/or otherwise provided to, the process for obtaining inventory item descriptions and/or the product description database by the manufacturers themselves.

In one embodiment, the seller's data from the computing system implemented financial management system is accessed by the process for obtaining inventory item descriptions via the seller allowing direct access to the data on the seller's computing system. In one embodiment, the seller's data from the computing system implemented financial management system is accessed when the seller uploads the data to the seller's website and/or when the seller is creating the website or modifying/adding the listed selected inventory items/products via a computing system implemented financial management system data upload. In one embodiment, the seller's data from the computing system implemented financial management system is transferred directly to the process for obtaining inventory item listings and/or the product description database by the seller. In one embodiment, the seller's data from the computing system implemented financial management system is obtained, normalized and then stored.

In one embodiment, the manufacturer's description of the selected product is transferred to the seller, in whole or in part, to populate a product description field associated with the selected product on the seller's website. In one embodiment, the manufacturer's description of the selected product is transferred to the seller for use, in whole or in part, to populate the description of the selected product in the seller's computing system implemented financial management system.

In one embodiment, the seller is offered the opportunity to view the manufacturer's description of the selected product and then choose to import all, part of, or none of, the manufacturer's description of the selected product. In one embodiment, the seller is provided the opportunity to edit and/or use only part of the manufacturer's description of the selected product. In one embodiment, if the seller chooses to use only part of the manufacturer's description of the selected product, a link is provided on the seller's website listing of the selected product and, when activated, the link links the user to the full description of the selected product on either the product description database or the manufacturer's website. In one embodiment, if the seller chooses to use only part of the manufacturer's description of the selected product, the full description of the selected product is provided on the seller's website listing of the selected product as a PDF or similar downloadable and/or viewable document.

Using the method and apparatus for obtaining inventory item descriptions, and process for obtaining inventory item descriptions, disclosed herein, a seller can easily, and automatically, access a manufacturer description of a selected product the seller sells, including photographs and video, for use as the description of the product on the seller's website and/or in the seller's computing system implemented financial management system. Consequently, using the method and apparatus for obtaining inventory item descriptions, and process for obtaining inventory item descriptions, disclosed herein, the seller is directly benefited by gaining access to often higher quality descriptions, photographs and video, of their inventory items/products, with little of no effort on the seller's part. At the same time, the product manufacturer is given the opportunity to widely, and uniformly, market their products and distribute descriptions and product data that are well produced, professional, and consistent, and that the manufacturer feels will present their product in the most favorable terms.

In addition, in one embodiment, the seller's identification, and/or website data, and/or location, and/or phone number, and/or other contact data is forwarded to the manufacturer so the manufacturer can list, or update, the seller's information in a retailers or "where-to-buy" listing section of the manufacturer's website. This, in turn, benefits both the seller and the manufacturer by supplying more potential customers for the product.

As used herein, the term computing system implemented financial management system includes, but is not limited to: computing system implemented business financial management systems, packages, programs, modules, or applications; computing system implemented inventory management systems, packages, programs, modules, or applications; computing system implemented sales management systems, packages, programs, modules, or applications; computing system implemented retail management systems, packages, programs, modules, or applications, including computing system implemented point of sale management systems, packages, programs, modules, or applications; computing system implemented personal and small business financial management systems, packages, programs, modules, or applications; computing system implemented accounting and/or invoicing systems, packages, programs, modules, or applications; and various other electronic data management systems, packages, programs, modules, or applications, whether available or known at the time of filing or as developed later.

For illustrative purposes, embodiments are described within the framework of, and using, one or more computing system implemented financial management systems. However, some embodiments are stand alone software programs, packages or applications capable of independent implementation. This and other various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether available or known at the time of filing or as developed later. Some embodiments are implemented in a mobile computing system running mobile operating systems such as Symbian® OS, Windows® Mobile, or any other operating system designed to generally manage operations on a mobile computing system, whether available or known at the time of filing or as developed later. As described more fully below, embodiments can be implemented on computing systems other than a conventional computing system such as, for example, a personal digital assistant, a cell phone, or other computing system capable of processing computer readable data, whether available at the time of filing or as developed later. Computing systems also include those in which one or more computing resources (hardware or software) are located remotely and accessed via network, such as a Local Area Network (LAN), Wide Area Network (WAN), a public network, such as the Internet, a private network, or other electronic medium in which data may be exchanged between one computing system and one or more other computing system(s), whether available at the time of filing or as developed later. Embodiments may be included as add-on software for existing software programs, packages or applications, and embodiments may be a feature of an application that is bundled with a computing system or sold separately. Some embodiments are stand alone software programs, packages or applications capable of independent implementation. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the computing system implemented financial management systems described herein make use of input provided to the computer device implementing the process and/or application for obtaining inventory item descriptions, discussed herein, via user interface devices such as a keyboard, mouse, touchpad, or any other device capable of providing user input to a computing system or for translating user actions into computing system operations, whether available or known at the time of filing or as developed later.

Hardware System Architecture

FIG. 1 is a block diagram of an exemplary hardware architecture for implementing one embodiment of a method and apparatus for obtaining inventory item descriptions, and/or a process and/or application for obtaining inventory item descriptions, such as processes for obtaining inventory item descriptions 200, 300, and 400, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more computing system implemented financial management systems 180 stored, in whole, or in part, therein, that is a parent system for, is used by, or include, as discussed below, a process and/or application for obtaining inventory item descriptions, such as processes for obtaining inventory item descriptions 200, 300, and 400, discussed below.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether available or known at the time of filing or as later developed. As discussed in more detail below, in one embodiment, a process and/or application for obtaining inventory item descriptions, such as processes for obtaining inventory item descriptions 200, 300, and 400, and a computing system implemented financial management system 180, and/or a search engine application (not shown) and/or data used by a search engine system (not shown) can be loaded, in whole, or in part, into computing system 100 via I/O device 113, such as from a CD, DVD or floppy disk containing all, or part, of computing system implemented financial management system 180 and/or a search engine application (not shown) and/or data used by a search engine system (not shown).

Similarly, computing system 150 typically includes a central processing unit (CPU) 151, hereinafter processor 151, an input/output (I/O) interface 155, and a memory system 153, including cache memory 153A. In one embodiment, memory system 153 includes one or more computing system implemented financial management systems 190 stored, in whole, or in part, therein, that is a parent system for, is used by, or include, as discussed below, a process and/or application for obtaining inventory item descriptions, such as processes for obtaining inventory item descriptions 200, 300, and 400.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process and/or application for obtaining inventory item descriptions, such as processes for obtaining inventory item descriptions 200, 300, and 400, and a computing system implemented financial management system 190, and/or a search engine application (not shown) and/or data used by a search engine system (not shown) can be loaded, in whole, or in part, into computing system 150 via I/O device 163, such as from a CD, DVD or floppy disk containing all, or part, of computing system implemented financial management system 190 and/or a search engine application (not shown) and/or data used by a search engine system (not shown).

Also shown in FIG. 1 is database 170. In one embodiment, database 170 is a designated server system or computing system, or a designated portion of a server system or computing system, such as computing systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process and/or application for obtaining inventory item descriptions, such as processes for obtaining inventory item descriptions 200, 300, and 400, and/or computing system implemented financial management system 180 and/or computing system implemented financial management system 190 and/or a search engine application (not shown) and/or data used by a search engine system (not shown) are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process and/or application for obtaining inventory item descriptions, such as processes for obtaining inventory item descriptions 200, 300, and 400, and a computing system implemented financial management system 180 and/or computing system implemented financial management system 190, and/or a search engine application (not shown) and/or data used by a search engine system (not shown) are stored and/or operated in whole, or in part, in/on server system 120.

Network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process and/or application for obtaining inventory item descriptions, such as processes for obtaining inventory item descriptions 200, 300, and 400, and a computing system implemented financial management system 180 and/or computing system implemented financial management system 190 and/or a search engine application (not shown) and/or data used by a search engine system (not shown) are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for obtaining inventory item descriptions, such as processes for obtaining inventory item descriptions 200, 300, and/or 400, and a computing system implemented financial management system, such as computing system implemented financial management systems 180 and/or 190, and/or a search engine application (not shown) and/or data used by a search engine system (not shown) are sometimes referred to herein, alternatively, as a process, an application, a module, a program, a component of a software system, a component of a software package, a component of a parent system, or a feature of a parent system, this terminology is illustrative only. In some embodiments, a process and/or application for obtaining inventory item descriptions, such as processes for obtaining inventory item descriptions 200, 300, and 400, and a computing system implemented financial management system, such as computing system implemented financial management systems 180 and/or 190, and/or a search engine application (not shown) and/or data used by a search engine system (not shown) discussed herein, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and 151, or server system processor 121. In one embodiment, execution of a process and/or application for obtaining inventory item descriptions, such as processes for obtaining inventory item descriptions 200, 300, and 400, and a computing system implemented financial management system, such as computing system implemented financial management systems 180 and/or 190, and/or a search engine application (not shown) discussed herein, by processor 101, processor 151, or server system processor 121, results in the operations of an agent computer process (not shown) and/or a rule computer process (not shown).

In one embodiment, a process and/or application for obtaining inventory item descriptions, such as processes for obtaining inventory item descriptions 200, 300, and 400, and a computing system implemented financial management system, such as computing system implemented financial management systems 180 and/or 190, and/or a search engine application (not shown) and/or data used by a search engine system (not shown) discussed herein, are a computer application or process implemented and/or run and/or stored, in full, or in part, in, or on, a computer program product. Herein, a computer program product comprises a medium configured to store or transport computer readable code, whether available or known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, the medium also may be removed from the computing system.

For example, all, or part, of a process and/or application for obtaining inventory item descriptions, such as processes for obtaining inventory item descriptions 200, 300, and 400, and a computing system implemented financial management system, such as computing system implemented financial management systems 180 and/or 190, and/or a search engine application (not shown) and/or data used by a search engine system (not shown) discussed herein, may be stored in a memory that is physically located in a location, such as server system memory 123, or database 170, of FIG. 1, different from a computing system, such as computing systems 100 and/or 150 of FIG. 1, utilizing a process and/or application for obtaining inventory item descriptions, such as processes for obtaining inventory item descriptions 200, 300, and 400, and a computing system implemented financial management system, such as computing system implemented financial management systems 180 and/or 190 and/or a search engine application (not shown) and/or data used by a search engine system (not shown). In one embodiment, all, or part, of a process and/or application for obtaining inventory item descriptions, such as processes for obtaining inventory item descriptions 200, 300, and 400, and a computing system implemented financial management system, such as computing system implemented financial management systems 180 and/or 190, and/or a search engine application (not shown) and/or data used by a search engine system (not shown) discussed herein, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process and/or application for obtaining inventory item descriptions, such as processes for obtaining inventory item descriptions 200, 300, and 400, and a computing system implemented financial management system, such as computing system implemented financial management systems 180 and/or 190, and/or a search engine application (not shown) and/or data used by a search engine system (not shown) discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process and/or application for obtaining inventory item descriptions, such as processes for obtaining inventory item descriptions 200, 300, and 400, and a computing system implemented financial management system, such as computing system implemented financial management systems 180 and/or 190, and/or a search engine application (not shown) and/or data used by a search engine system (not shown) discussed herein, in accordance with at least one of the embodiments as described herein. Similarly, in another embodiment, a process and/or application for obtaining inventory item descriptions, such as processes for obtaining inventory item descriptions 200, 300, and 400, and a computing system implemented financial management system, such as computing system implemented financial management systems 180 and/or 190, and/or a search engine application (not shown) and/or data used by a search engine system (not shown) discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

In accordance with one embodiment, a process for obtaining inventory item descriptions includes providing a product description database. In one embodiment, a manufacturer's description of a selected product is then obtained and stored in the product description database using the manufacturer's identification data, such as UPC number, manufacturer part number, manufacturer product name, or any other manufacturer product identifier code and/or data as an index/locator.

In one embodiment, seller data from a computing system implemented financial management system used by a seller of the selected product, such as, in one embodiment, data from a computing system implemented point of sale system, is then accessed to obtain a mapping between the seller's identification data for the selected product, such as a UPC code, seller inventory number, seller catalog number, or seller product number with the manufacturer's identification data for the selected product. In one embodiment, the product description database is then searched using the mapped seller's identification data for the selected product. In one embodiment, when the manufacturer's description of the selected product is found, the manufacturer's description of the selected product is transferred to the seller for use, in whole or in part, as the seller's description of the selected product on the seller's website.

Figure 2:
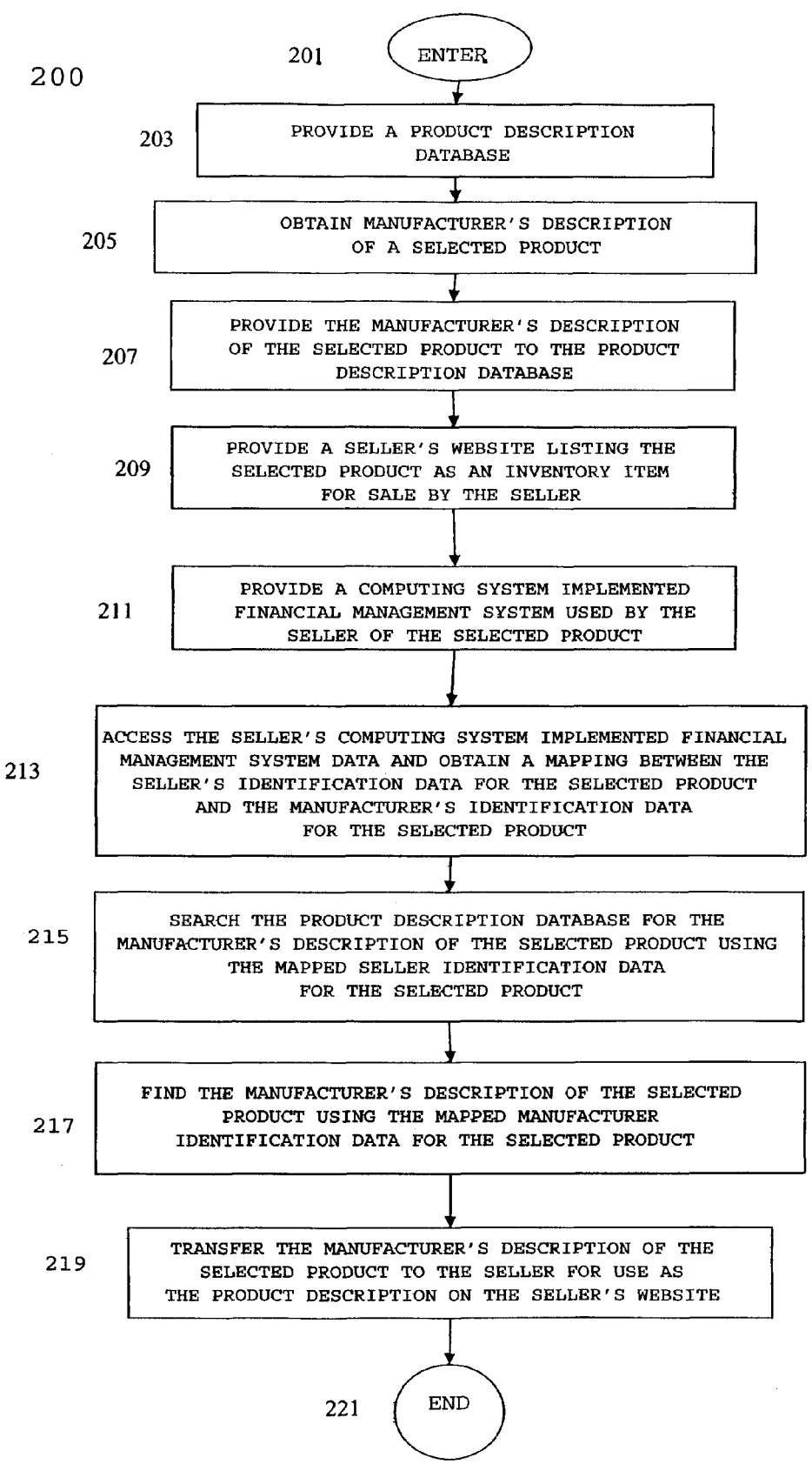
FIG. 2 is a flow chart depicting a process for obtaining inventory item descriptions in accordance with one embodiment.

FIG. 2 is a flow chart depicting a process for obtaining inventory item descriptions 200 in accordance with one embodiment. Process for obtaining inventory item descriptions 200 begins at ENTER OPERATION 201 and process flow proceeds to PROVIDE A PRODUCT DESCRIPTION DATABASE OPERATION 203.

In one embodiment, at PROVIDE A PRODUCT DESCRIPTION DATABASE OPERATION 203 a product description database is provided. As used herein, the term "database", or "product description database" includes, but is not limited to; any server system or computing system, or a designated portion of a server system or computing system, such as computing systems 100, 150 and 120 of FIG. 1; any dedicated storage device; any database such as database 170 of FIG. 1; any mass storage device implemented in software, hardware, or a combination of hardware and software; any web-based function; and/or any collection of one or more of the above that are connected by a network or network system such as, network 130 of FIG. 1 and/or a Local Area Network (LAN), a Wide Area Network (WAN), a public network, such as the Internet, a private network, or other network capable of allowing communication between two or more computing systems and one or more databases, whether available or known at the time of filing or as later developed.

Returning to FIG. 2, in one embodiment, the product description database provided at PROVIDE A PRODUCT DESCRIPTION DATABASE OPERATION 203 is a normalized, or standardized, database for easy mapping of fields and transfer of data. As used herein, the term "normalized database" refers to a data base whose logical data model has been restructured to: standardize data formatting; eliminate redundancy, i.e., eliminate storing the same data in more than one table; organize data efficiently and ensure data dependencies make sense, i.e., only storing related data in a table; and reduce the potential for anomalies during data operations to improve data consistency and future enhancements. In contrast, a database that is not normalized is one that has not been broken down logically into smaller, more manageable tables and may include data that is contained in one or more different tables for no apparent reason.

In one embodiment, the product description database provided at PROVIDE A PRODUCT DESCRIPTION DATABASE OPERATION 203 is part of a search engine related database. In one embodiment, the product description database provided at PROVIDE A PRODUCT DESCRIPTION DATABASE OPERATION 203 is at least a portion of one of several known dedicated search engine databases, such as Google Base/Froogle of Google Inc., 1600 Amphitheatre Parkway, Mountain View, Calif. 94043, or any similar system associated with similar search engines. Search engine databases are particularly well suited for use with the processes for obtaining inventory item descriptions disclosed herein, such as process for obtaining inventory item descriptions 200, 300 and 400, due to the fact that these databases typically contain extensive sets of manufacturer's product descriptions from manufacturer websites and other Internet sources and these descriptions are often organized and/or listed by identification data associated with the inventory item, such as UPC codes, manufacturer product numbers, etc. In addition, by definition, these databases are already formatted for, and associated with, a search engine function.

In one embodiment, the product description database is provided at PROVIDE A PRODUCT DESCRIPTION DATABASE OPERATION 203 by the manufacturer of product. In other instances the product description database provided at PROVIDE A PRODUCT DESCRIPTION DATABASE OPERATION 203 is a subscriber database specifically designed to provide manufacturer product descriptions based on UPC codes or other unique inventory item identifiers. In other embodiments, the product description database provided at PROVIDE A PRODUCT DESCRIPTION DATABASE OPERATION 203 includes, but is not limited to: general business databases and/or systems; general product databases and/or systems; databases and/or systems associated with and/or offered by a particular business, product, or manufacturer; databases and/or systems offered by various communities, watch-dog groups, and/or special interest groups; databases associated with product and/or manufacturer rating and review systems; and/or any other databases and/or systems, organized by any party, for any purpose, whereby manufacturer data and/or descriptions of a manufacturer's product are obtained and provided to general users, subscription users, member users, or any other type of user. In one embodiment, the product description database provided at PROVIDE A PRODUCT DESCRIPTION DATABASE OPERATION 203 is embedded in, or on, a computer program product as defined herein.

In one embodiment, once a product description database is provided at PROVIDE A PRODUCT DESCRIPTION DATABASE OPERATION 203, process flow proceeds to OBTAIN MANUFACTURER'S DESCRIPTION OF A SELECTED PRODUCT OPERATION 205.

In one embodiment, at OBTAIN MANUFACTURER'S DESCRIPTION OF A SELECTED PRODUCT OPERATION 205, a manufacturer's description of a selected product is obtained. As used herein, the term "description of a selected product" and/or "description" includes, but is not limited to, written descriptions of the selected product, and/or photographs of the selected product, and/or video images of the selected product, and/or illustrations and graphical images of the selected product. For instance, a manufacturer's description of a selected product can include: data associated with a text description of the product, in any language; a digital or analog photograph, drawing, or machine created representation or image of the product and/or a product trademark or function; a digital or analog video representation of the product, a photograph of the product, a drawing, or machine created, representation or image of the product and/or a product trademark or function the product; an audio description or representation of the product; or any other means or mechanism for relaying information about and/or images of the product to a user.

In one embodiment, the manufacturer's description of the selected product is obtained at OBTAIN MANUFACTURER'S DESCRIPTION OF A SELECTED PRODUCT OPERATION 205 using a search engine, such as Google/Froogle of Google Inc., 1600 Amphitheatre Parkway, Mountain View, Calif. 94043, or any similar system, and by searching the manufacturer's websites and or any databases, as defined herein, through any network or network system such as, network 130 of FIG. 1 and/or a Local Area Network (LAN), a Wide Area Network (WAN), a public network, such as the Internet, a private network, or other network capable of allowing communication between two or more computing systems and one or more databases, whether available or known at the time of filing or as later developed. In one embodiment, the manufacturer's product description of the selected product, and/or the manufacturer product identification data, are directly transferred to the product description database at OBTAIN MANUFACTURER'S DESCRIPTION OF A SELECTED PRODUCT OPERATION 205 via any network or network system capable of allowing communication between two or more computing systems and one or more databases, whether available or known at the time of filing or as later developed.

In one embodiment, the manufacturer's product description of the selected product is obtained at OBTAIN MANUFACTURER'S DESCRIPTION OF A SELECTED PRODUCT OPERATION 205 via data embedded in, or on, a computer program product, as defined herein, provided to the provider of process for obtaining inventory item descriptions 200 and/or the product description database.

In one embodiment, once the manufacturer's description of the selected product is obtained at OBTAIN MANUFACTURER'S DESCRIPTION OF A SELECTED PRODUCT OPERATION 205, process flow proceeds to PROVIDE THE MANUFACTURER'S DESCRIPTION OF THE SELECTED PRODUCT TO THE PRODUCT DESCRIPTION DATABASE OPERATION 207.

In one embodiment, at PROVIDE THE MANUFACTURER'S DESCRIPTION OF THE SELECTED PRODUCT TO THE PRODUCT DESCRIPTION DATABASE OPERATION 207 the manufacturer's description of the selected product obtained at OBTAIN MANUFACTURER'S DESCRIPTION OF A SELECTED PRODUCT OPERATION 205 is provided to the product description database by any of the means discussed above.

In other embodiments, the manufacturer's description of the selected product obtained at OBTAIN MANUFACTURER'S DESCRIPTION OF A SELECTED PRODUCT OPERATION 205 is provided to the product description database at PROVIDE THE MANUFACTURER'S DESCRIPTION OF THE SELECTED PRODUCT TO THE PRODUCT DESCRIPTION DATABASE OPERATION 207 using any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, the manufacturer's description of the selected product obtained at OBTAIN MANUFACTURER'S DESCRIPTION OF A SELECTED PRODUCT OPERATION 205 is normalized and/or formatted and/or indexed by methods well known to those of skill in the art at PROVIDE THE MANUFACTURER'S DESCRIPTION OF THE SELECTED PRODUCT TO THE PRODUCT DESCRIPTION DATABASE OPERATION 207 and then stored in whole, or in part, on/in the product description database of PROVIDE A PRODUCT DESCRIPTION DATABASE OPERATION 203 by any one of the numerous mechanisms known to those of skill in the art.

In one embodiment, once the manufacturer's description of the selected product is provided to the product description database at PROVIDE THE MANUFACTURER'S DESCRIPTION OF THE SELECTED PRODUCT TO THE PRODUCT DESCRIPTION DATABASE OPERATION 207, process flow proceeds to PROVIDE A SELLER'S WEBSITE LISTING THE SELECTED PRODUCT AS AN INVENTORY ITEM FOR SALE BY THE SELLER OPERATION 209.

In one embodiment, at PROVIDE A SELLER'S WEBSITE LISTING THE SELECTED PRODUCT AS AN INVENTORY ITEM FOR SALE BY THE SELLER OPERATION 209 a website, or other presence on a network, is provided that lists the selected product as an inventory item for sale by the seller. In one embodiment, the website of PROVIDE A SELLER'S WEBSITE LISTING THE SELECTED PRODUCT AS AN INVENTORY ITEM FOR SALE BY THE SELLER OPERATION 209 includes a field for a description associated with the each listed product.

In one embodiment, the website provided at PROVIDE A SELLER'S WEBSITE LISTING THE SELECTED PRODUCT AS AN INVENTORY ITEM FOR SALE BY THE SELLER OPERATION 209 is accessed and/or available via a network, such as network 130 of FIG. 1. As discussed above, network 130 can be any network or network system that is of interest to a user such as a Local Area Network (LAN), a Wide Area Network (WAN), a public network, such as the Internet, a private network, or other network capable of allowing communication between two or more computing systems, and/or server systems, and/or databases, and/or web sites/web functions whether known at the time of filing or as developed later.

Methods, means and mechanisms for creating and providing websites are well known to those of skill in the art. Consequently a more detailed discussion of the methods, means and mechanisms for providing a website or other presence on a network is omitted here to avoid detracting from the invention.

Returning to FIG. 2, in one embodiment, once a website, or other presence on a network, is provided that lists the selected product as an inventory item for sale by the seller at PROVIDE A SELLER'S WEBSITE LISTING THE SELECTED PRODUCT AS AN INVENTORY ITEM FOR SALE BY THE SELLER OPERATION 209, process flow proceeds to PROVIDE A COMPUTING SYSTEM IMPLEMENTED FINANCIAL MANAGEMENT SYSTEM USED BY THE SELLER OF THE SELECTED PRODUCT OPERATION 211.

In one embodiment, at PROVIDE A COMPUTING SYSTEM IMPLEMENTED FINANCIAL MANAGEMENT SYSTEM USED BY THE SELLER OF THE SELECTED PRODUCT OPERATION 211 a computing system implemented financial management system, such as computing system implemented financial management system 180 and/or computing system implemented financial management system 190 of FIG. 1 is provided.

As discussed above, As used herein, the term computing system implemented financial management system includes, but is not limited to: computing system implemented business financial management systems, packages, programs, modules, or applications; computing system implemented inventory management systems, packages, programs, modules, or applications; computing system implemented sales management systems, packages, programs, modules, or applications; computing system implemented retail management systems, packages, programs, modules, or applications, including computing system implemented point of sale management systems, packages, programs, modules, or applications; computing system implemented personal and small business financial management systems, packages, programs, modules, or applications; computing system implemented accounting and/or invoicing systems, packages, programs, modules, or applications; and various other electronic data management systems, packages, programs, modules, or applications, whether available or known at the time of filing or as developed later.

Returning to FIG. 2, one or more of these computing system implemented financial management systems would often already be implemented by a user of process for obtaining inventory item descriptions 200 and, in some embodiments, process for obtaining inventory item descriptions 200 is a component, function, or module, of one or more of these computing system implemented financial management systems.

As also discussed above, many businesses make use of computing system implemented financial management systems and, in many cases, one or more of these computing system implemented financial management systems are used to list and track inventory items, provide descriptions of the inventory items to users of the computing system implemented financial management systems and/or customers of the businesses using the computing system implemented financial management systems, and/or to track sales of the inventory items. As a result, computing system implemented financial management systems often require a description of each inventory item be provided to the computing system implemented financial management system so the computing system implemented financial management system can create a listing for each inventory item for viewing by sales personnel and potential customers and for internal tracking of inventory items.

In addition, many computing system implemented financial management systems also generate various inventory and sales management documents, such as purchase orders, inventory receipts, purchase receipts, and various other documents that include both the seller/user of the computing system implemented financial management system's identification data associated with the selected product/inventory item, as well as the manufacturers identification data associated with the selected product/inventory item. As discussed below, these documents are significant in that they can be used to provide a mapping feature between the seller's identification data/nomenclature/code for the selected product and the manufacturer's identification data/nomenclature/code for the selected product.

As discussed below, while, in one embodiment, the computing system implemented financial management system, and the computing system implemented financial management system data discussed above, resides in or on the seller's computing system implementing the computing system implemented financial management system, several computing system implemented financial management systems provide the user of the computing system implemented financial management system with the capability to automatically or semi-automatically upload all or part of the data describing inventory items/products and or inventory item/product transactions to a website and/or database.

As discussed below, in one embodiment, in theses instances, when the seller uploads the computing system implemented financial management system data to his or her website, a website creation guide, such as a website creation wizard, or other automated help device, asks the seller if he or she would like to use the computing system implemented financial management system data in an effort to obtain a manufacturer product description. If the seller indicates this is desired, the computing system implemented financial management system data would be processed and/or forwarded to, or accessed by, process for obtaining inventory item descriptions 200.

In one embodiment, once a computing system implemented financial management system is provided at PROVIDE A COMPUTING SYSTEM IMPLEMENTED FINANCIAL MANAGEMENT SYSTEM USED BY THE SELLER OF THE SELECTED PRODUCT OPERATION 211, process flow proceeds to ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 213.

In one embodiment, at ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 213, access to data associated with, used by, or generated by the seller's computing system implemented financial management system is provided. As discussed above, many computing system implemented financial management systems generate documents, data and/or files that provide data for a mapping between the seller's identification data/nomenclature/code for the selected product, such as a UPC code, seller inventory number, seller catalog number, or seller product number, and the manufacturer's identification data/nomenclature/code for the selected product, such as such as UPC number, manufacturer part number, manufacturer product name, or any other manufacturer product identifier code and/or data.

As an example, an invoice sent to the seller by the manufacturer would, in many cases, be processed through the seller's computing system implemented financial management system, such as a computing system implemented inventory, point of sale, business management, or accounting system, such that the resulting document showing either the invoice itself or payment on the invoice, would include both the manufacturers part number for the selected product and the seller's inventory number for the selected product.

It is important to provide this mapping between the seller's identification data/nomenclature/code for the selected product and the manufacturer's identification data/nomenclature/code for the selected product because, absent such mapping, in many cases, accurate correlations between the seller's inventory item/product and a manufacturer's product description for the inventory item/product would be difficult, if not impossible.

In one embodiment, the mapping data from the computing system implemented financial management system is accessed at ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 213, when the seller uploads computing system implemented financial management system data to the seller's website provided at PROVIDE A COMPUTING SYSTEM IMPLEMENTED FINANCIAL MANAGEMENT SYSTEM USED BY THE SELLER OF THE SELECTED PRODUCT OPERATION 211 and/or when the seller is creating the website or modifying/adding the listing for the selected product by uploading computing system implemented financial management system data. Several computing system implemented financial management systems provide the user of the computing system implemented financial management system with the capability to automatically or semi-automatically upload all or part of the data describing inventory items/products and or inventory item/product transactions to a website and/or database. In one embodiment, when the seller uploads the computing system implemented financial management system data to his or her website, a website creation guide, such as a website creation wizard, or other automated help device, asks the seller if he or she would like to use the computing system implemented financial management system data in an effort to obtain a manufacturer product description. If the seller indicates this is desired, the computing system implemented financial management system data would be processed and/or forwarded to, or accessed by, process for obtaining inventory item descriptions 200.

In one embodiment, the mapping data from the computing system implemented financial management system is transferred to product description database by the seller directly through the computing system implemented financial management system at ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 213. In this embodiment, an automated help device associated with the computing system implemented financial management system, such as a wizard, or other automated help device, asks the seller if he or she would like to use the computing system implemented financial management system data in an effort to obtain a manufacturer product description of the selected product. If the seller indicates this is desired, the computing system implemented financial management system data is processed and/or forwarded to, or accessed by, process for obtaining inventory item descriptions 200.

In one embodiment, the mapping data from the computing system implemented financial management system is transferred directly the to process for obtaining inventory item descriptions 200 by the seller at ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 213 by either direct transfer using any of the means discussed above, or by allowing process for obtaining inventory item descriptions 200 access to the seller' computer and/or database.

In one embodiment, once access to mapping data associated with, used by, or generated by the seller's computing system implemented financial management system is provided at ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 213, process flow proceeds to SEARCH THE PRODUCT DESCRIPTION DATABASE FOR THE MANUFACTURER'S DESCRIPTION OF THE SELECTED PRODUCT USING THE MAPPED MANUFACTURER IDENTIFICATION DATA FOR THE SELECTED PRODUCT OPERATION 215.

In one embodiment, at SEARCH THE PRODUCT DESCRIPTION DATABASE FOR THE MANUFACTURER'S DESCRIPTION OF THE SELECTED PRODUCT USING THE MAPPED MANUFACTURER IDENTIFICATION DATA FOR THE SELECTED PRODUCT OPERATION 215, the product description database of PROVIDE A PRODUCT DESCRIPTION DATABASE OPERATION 203 is searched using the mapped manufacturer identification data for the selected product obtained at ACCESS THE SELLER'S COMPUTING SYSTEM IMPLEMENTED FINANCIAL MANAGEMENT SYSTEM DATA AND OBTAIN A MAPPING BETWEEN THE SELLER'S IDEN- TIFICATION DATA FOR THE SELECTED PRODUCT AND THE MANUFACTURER'S IDENTIFICATION DATA FOR THE SELECTED PRODUCT OPERATION 213. Methods, means and mechanisms for searching a database are well known to those of skill in the art. Consequently, a more detailed discussion of methods, means and mechanisms for searching the product description database for a manufacturer product description of the selected product is omitted here to avoid detracting from the invention.

In one embodiment, at FIND THE MANUFACTURER'S DESCRIPTION OF THE SELECTED PRODUCT USING THE MAPPED MANUFACTURER IDENTIFICATION DATA FOR THE SELECTED PRODUCT OPERATION 217 a manufacturer's description of the selected product is found as a result of the search conducted at SEARCH THE PRODUCT DESCRIPTION DATABASE FOR THE MANUFACTURER'S DESCRIPTION OF THE SELECTED PRODUCT USING THE MAPPED MANUFACTURER IDENTIFICATION DATA FOR THE SELECTED PRODUCT OPERATION 215. In one embodiment, the manufacturer's description of the selected product found is also saved at FIND THE MANUFACTURER'S DESCRIPTION OF THE SELECTED PRODUCT USING THE MAPPED MANUFACTURER IDENTIFICATION DATA FOR THE SELECTED PRODUCT OPERATION 217 by directing the storing of the manufacturer product description data, in whole, or in part, in a database maintained by, accessible by, owned by, or otherwise related to, the seller by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in a computer readable medium, and/or any other computer program product, as defined herein. In one embodiment, the data, in whole, or in part, is stored on a webpage or in a web-based system.

In some embodiments, the data stored as described above is maintained, in whole, or in part, by: the seller, or a seller computing system; a third party data storage institution; the product manufacturer; the provider of a computing system implemented financial management system implementing process for obtaining inventory item descriptions 200, such as processes 200, 300 and 400; the provider of a process for obtaining inventory item descriptions 200, such as processes 200, 300 and 400; the provider of the product description database; any third party service or institution; or any other parties.

In one embodiment, once the manufacturer's description of the selected product is found and/or stored at FIND THE MANUFACTURER'S DESCRIPTION OF THE SELECTED PRODUCT USING THE MAPPED MANUFACTURER IDENTIFICATION DATA FOR THE SELECTED PRODUCT OPERATION 217, process flow proceeds to TRANSFER THE MANUFACTURER'S DESCRIPTION OF THE SELECTED PRODUCT TO THE SELLER FOR USE AS THE PRODUCT DESCRIPTION ON THE SELLER'S WEBSITE OPERATION 219.

In one embodiment, at TRANSFER THE MANUFACTURER'S DESCRIPTION OF THE SELECTED PRODUCT TO THE SELLER FOR USE AS THE PRODUCT DESCRIPTION ON THE SELLER'S WEBSITE OPERATION 219 the manufacturer's description of the selected product found at FIND THE MANUFACTURER'S DESCRIPTION OF THE SELECTED PRODUCT USING THE MAPPED MANUFACTURER IDENTIFICATION DATA FOR THE SELECTED PRODUCT OPERATION 217 is transferred to the seller's website of PROVIDE A SELLER'S WEBSITE LISTING THE SELECTED PRODUCT AS AN INVENTORY ITEM FOR SALE BY THE SELLER OPERATION 209 and is used to populate the product description field for the selected product on the seller's website of PROVIDE A SELLER'S WEBSITE LISTING THE SELECTED PRODUCT AS AN INVENTORY ITEM FOR SALE BY THE SELLER OPERATION 209.

In one embodiment, the manufacturer's description of the selected product is transferred to the seller's website via any one of the numerous mechanisms known to those of skill in the art for transferring data from one device, and/or computing system, and/or server system and/or database to one or more other computing systems, and/or server systems and/or databases and/or web sites/web functions and/or as discussed herein, whether known at the time of filing or as later developed.

For instance, in one embodiment, the manufacturer's description of the selected product is transferred to the seller's website at TRANSFER THE MANUFACTURER'S DESCRIPTION OF THE SELECTED PRODUCT TO THE SELLER FOR USE AS THE PRODUCT DESCRIPTION ON THE SELLER'S WEBSITE OPERATION 219 using a network, such as network 130 of FIG. 1. As discussed above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

Returning to FIG. 2, in other embodiments, the manufacturer's description of the selected product is transferred to the seller's website using any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, once the manufacturer's description of the product is transferred to the seller at TRANSFER THE MANUFACTURER'S DESCRIPTION OF THE SELECTED PRODUCT TO THE SELLER FOR USE AS THE PRODUCT DESCRIPTION ON THE SELLER'S WEBSITE OPERATION 219, the seller's identification, and/or website data, and/or location, and/or phone number, and/or other contact data is forwarded to the manufacturer so the manufacturer can list, or update, the seller's information in a retailers or "where-to-buy" listing section of the manufacturer's website. In one embodiment, the seller's contact data is transferred to the manufacturer's website using any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, once the manufacturer's description of the selected inventory item found at FIND THE MANUFACTURER'S DESCRIPTION OF THE SELECTED PRODUCT USING THE MAPPED MANUFACTURER IDENTIFICATION DATA FOR THE SELECTED PRODUCT OPERATION 217 is used to automatically, or semi-automatically, populate the product description field of the seller's website for the selected product with a manufacturer's description of the selected product at TRANSFER THE MANUFACTURER'S DESCRIPTION OF THE SELECTED PRODUCT TO THE SELLER FOR USE AS THE PRODUCT DESCRIPTION ON THE SELLER'S WEBSITE OPERATION 219 process flow proceeds to END OPERATION 221 and process for obtaining inventory item descriptions 200 is exited.

As discussed above, using process for obtaining inventory item descriptions 200, a seller can easily, and automatically, access manufacturer descriptions, including photographs and video, of inventory item/products for use as the descriptions on the seller's website. Consequently, using process for obtaining inventory item descriptions 200, the seller is directly benefited by gaining access to often higher quality descriptions, photographs and video of their inventory items/products, with little of no effort on the seller's part. At the same time, the product manufacturer is given the opportunity to widely, and uniformly, market their product and distribute descriptions and product data that are consistent and that the manufacturer feels will present their product in the most favorable terms.

In addition, as discussed above, using one embodiment of process for obtaining inventory item descriptions 200, the seller's identification, and/or website data, and/or location, and/or phone number, and/or other contact data is forwarded to the manufacturer so the manufacturer can list, or update, the seller's information in a retailers or "where-to-buy" listing section of the manufacturer's website. This, in turn, benefits both the seller and the manufacturer by supplying more potential customers for the product.

In some instances, it is desirable to use the manufacturer's description of the selected product within the computing system implemented financial management system as the computing system implemented financial management system's product description.

FIG. 3 is a flow chart depicting a process for obtaining inventory item descriptions 300 in accordance with one embodiment. Process for obtaining inventory item descriptions 300 begins at ENTER OPERATION 301 and process flow proceeds to PROVIDE A PRODUCT DESCRIPTION DATABASE OPERATION 303.

In one embodiment: PROVIDE A PRODUCT DESCRIPTION DATABASE OPERATION 303; OBTAIN MANUFACTURER'S DESCRIPTION OF A SELECTED PRODUCT OPERATION 305; PROVIDE THE MANUFACTURER'S DESCRIPTION OF THE SELECTED PRODUCT TO THE PRODUCT DESCRIPTION DATABASE OPERATION 307; PROVIDE A COMPUTING SYSTEM IMPLEMENTED FINANCIAL MANAGEMENT SYSTEM USED BY THE SELLER OF THE SELECTED PRODUCT OPERATION 311; ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 313; SEARCH THE PRODUCT DESCRIPTION DATABASE FOR THE MANUFACTURER'S DESCRIPTION OF THE SELECTED PRODUCT USING THE MAPPED MANUFACTURER IDENTIFICATION DATA FOR THE SELECTED PRODUCT OPERATION 315; and FIND THE MANUFACTURER'S DESCRIPTION OF THE SELECTED PRODUCT USING THE MAPPED MANUFACTURER IDENTIFICATION DATA FOR THE SELECTED PRODUCT OPERATION 317 of process for obtaining inventory item descriptions 300 of FIG. 3 are substantially identical to similarly identified and numbered operations: PROVIDE A PRODUCT DESCRIPTION DATABASE OPERATION 203; OBTAIN MANUFACTURER'S DESCRIPTION OF A SELECTED PRODUCT OPERATION 205; PROVIDE THE MANUFACTURER'S DESCRIPTION OF THE SELECTED PRODUCT TO THE PRODUCT DESCRIPTION DATABASE OPERATION 207; PROVIDE A COMPUTING SYSTEM IMPLEMENTED FINANCIAL MANAGEMENT SYSTEM USED BY THE SELLER OF THE SELECTED PRODUCT OPERATION 211; ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 213; SEARCH THE PRODUCT DESCRIPTION DATABASE FOR THE MANUFACTURER'S DESCRIPTION OF THE SELECTED PRODUCT USING THE MAPPED MANUFACTURER IDENTIFICATION DATA FOR THE SELECTED PRODUCT OPERATION 215; and FIND THE MANUFACTURER'S DESCRIPTION OF THE SELECTED PRODUCT USING THE MAPPED MANUFACTURER IDENTIFICATION DATA FOR THE SELECTED PRODUCT OPERATION 217 of process for obtaining inventory item descriptions 200 of FIG. 2. Consequently, the discussion above with respect to: PROVIDE A PRODUCT DESCRIPTION DATABASE OPERATION 203; OBTAIN MANUFACTURER'S DESCRIPTION OF A SELECTED PRODUCT OPERATION 205; PROVIDE THE MANUFACTURER'S DESCRIPTION OF THE SELECTED PRODUCT TO THE PRODUCT DESCRIPTION DATABASE OPERATION 207; PROVIDE A COMPUTING SYSTEM IMPLEMENTED FINANCIAL MANAGEMENT SYSTEM USED BY THE SELLER OF THE SELECTED PRODUCT OPERATION 211; ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 213; SEARCH THE PRODUCT DESCRIPTION DATABASE FOR THE MANUFACTURER'S DESCRIPTION OF THE SELECTED PRODUCT USING THE MAPPED MANUFACTURER IDENTIFICATION DATA FOR THE SELECTED PRODUCT OPERATION 215; and FIND THE MANUFACTURER'S DESCRIPTION OF THE SELECTED PRODUCT USING THE MAPPED MANUFACTURER IDENTIFICATION DATA FOR THE SELECTED PRODUCT OPERATION 217 of process for obtaining inventory item descriptions 200 of FIG. 2 is applicable to, and incorporated here for, similarly identified and numbered operations: PROVIDE A PRODUCT DESCRIPTION DATABASE OPERATION 303; OBTAIN MANUFACTURER'S DESCRIPTION OF A SELECTED PRODUCT OPERATION 305; PROVIDE THE MANUFACTURER'S DESCRIPTION OF THE SELECTED PRODUCT TO THE PRODUCT DESCRIPTION DATABASE OPERATION 307; PROVIDE A COMPUTING SYSTEM IMPLEMENTED FINANCIAL MANAGEMENT SYSTEM USED BY THE SELLER OF THE SELECTED PRODUCT OPERATION 311; ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 313; SEARCH THE PRODUCT DESCRIPTION DATABASE FOR THE MANUFACTURER'S DESCRIPTION OF THE SELECTED PRODUCT USING THE MAPPED MANUFACTURER IDENTIFICATION DATA FOR THE SELECTED PRODUCT OPERATION 315; and FIND THE MANUFACTURER'S DESCRIPTION OF THE SELECTED PRODUCT USING THE MAPPED MANUFACTURER IDENTIFICATION DATA FOR THE SELECTED PRODUCT OPERATION 317 of process for obtaining inventory item descriptions 300 of FIG. 3.

In one embodiment, once the manufacturer's description of the selected product is found and/or stored at FIND THE MANUFACTURER'S DESCRIPTION OF THE SELECTED PRODUCT USING THE MAPPED MANUFACTURER IDENTIFICATION DATA FOR THE SELECTED PRODUCT OPERATION 317, process flow proceeds to TRANSFER THE MANUFACTURER'S DESCRIPTION OF THE SELECTED PRODUCT TO THE SELLER FOR USE AS THE PRODUCT DESCRIPTION IN THE SELLER'S COMPUTING SYSTEM IMPLEMENTED FINANCIAL MANAGEMENT SYSTEM OPERATION 320.

In one embodiment, at TRANSFER THE MANUFACTURER'S DESCRIPTION OF THE SELECTED PRODUCT TO THE SELLER FOR USE AS THE PRODUCT DESCRIPTION IN THE SELLER'S COMPUTING SYSTEM IMPLEMENTED FINANCIAL MANAGEMENT SYSTEM OPERATION 320 the manufacturer's description of the selected product found at FIND THE MANUFACTURER'S DESCRIPTION OF THE SELECTED PRODUCT USING THE MAPPED MANUFACTURER IDENTIFICATION DATA FOR THE SELECTED PRODUCT OPERATION 317 is transferred to the seller's computing system implemented financial management system for use in populating the product description field for the selected product in the seller's computing system implemented financial management system.

In one embodiment, the manufacturer's description of the selected product is transferred to the seller's computing system implemented financial management system via any one of the numerous mechanisms known to those of skill in the art for transferring data from one device, and/or computing system, and/or server system and/or database to one or more other computing systems, and/or server systems and/or databases and/or web sites/web functions, such as discussed herein, whether known at the time of filing or as developed later.

For instance, in one embodiment, the manufacturer's description of the product is transferred to the seller's computing system implemented financial management system at TRANSFER THE MANUFACTURER'S DESCRIPTION OF THE SELECTED PRODUCT TO THE SELLER FOR USE AS THE PRODUCT DESCRIPTION IN THE SELLER'S COMPUTING SYSTEM IMPLEMENTED FINANCIAL MANAGEMENT SYSTEM OPERATION using a network, such as network 130 of FIG. 1. As discussed above, network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed.

Returning to FIG. 3, in other embodiments, the manufacturer's description of the selected product is transferred to the seller's computing system implemented financial management system using any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, once the manufacturer's description of the selected inventory item found at FIND THE MANUFACTURER'S DESCRIPTION OF THE SELECTED PRODUCT USING THE MAPPED MANUFACTURER IDENTIFICATION DATA FOR THE SELECTED PRODUCT OPERATION 317 is used to automatically, or semi-automatically, populate the product description field of the seller's computing system implemented financial management system for the selected product with a manufacturer's description of the product at TRANSFER THE MANUFACTURER'S DESCRIPTION OF THE SELECTED PRODUCT TO THE SELLER FOR USE AS THE PRODUCT DESCRIPTION IN THE SELLER'S COMPUTING SYSTEM IMPLEMENTED FINANCIAL MANAGEMENT SYSTEM OPERATION 320, process flow proceeds to END OPERATION 321 and process for obtaining inventory item descriptions 300 is exited.

In one embodiment, the seller is offered the opportunity to view the manufacturer's description of the product and then choose to import all, part of, or none of, the manufacturer's description of the product. In one embodiment, the seller is provided the opportunity to edit the manufacturer's description of the product.

In one embodiment, if the seller chooses to use only part of the manufacturer's description of the product, a link is provided on the seller's website listing of the product and, when activated, the link links the user to the full description of the product on either the product description database or the manufacturer's website.

In one embodiment, if the seller chooses to use only part of the manufacturer's description of the product, the full description of the product is provided on the seller's website listing of the product as a PDF or similar downloadable and/or viewable document.

Figure 4A:
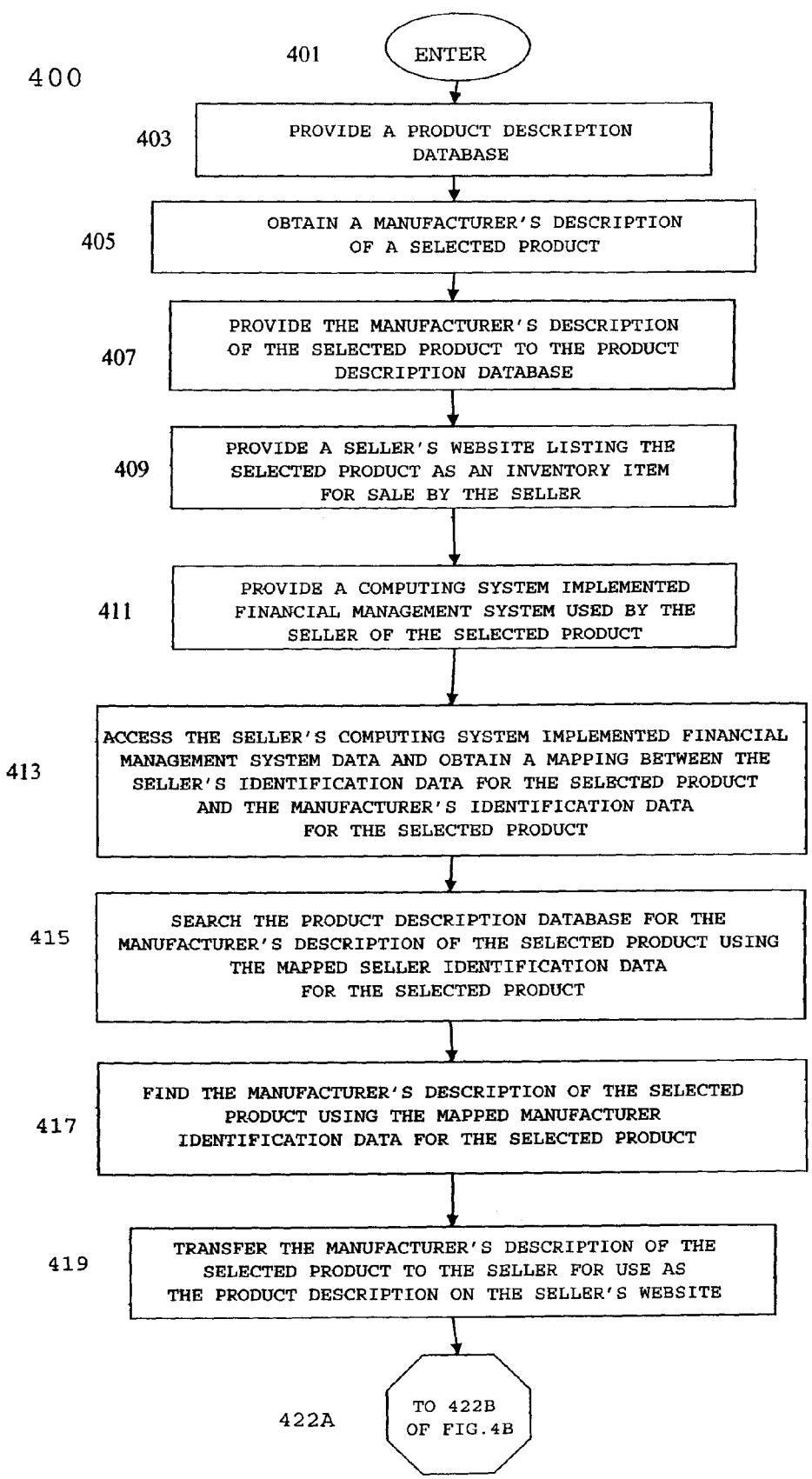
FIGS. 4A and 4B together are a flow chart depicting a process for obtaining inventory item descriptions in accordance with one embodiment.
Figure 4B:
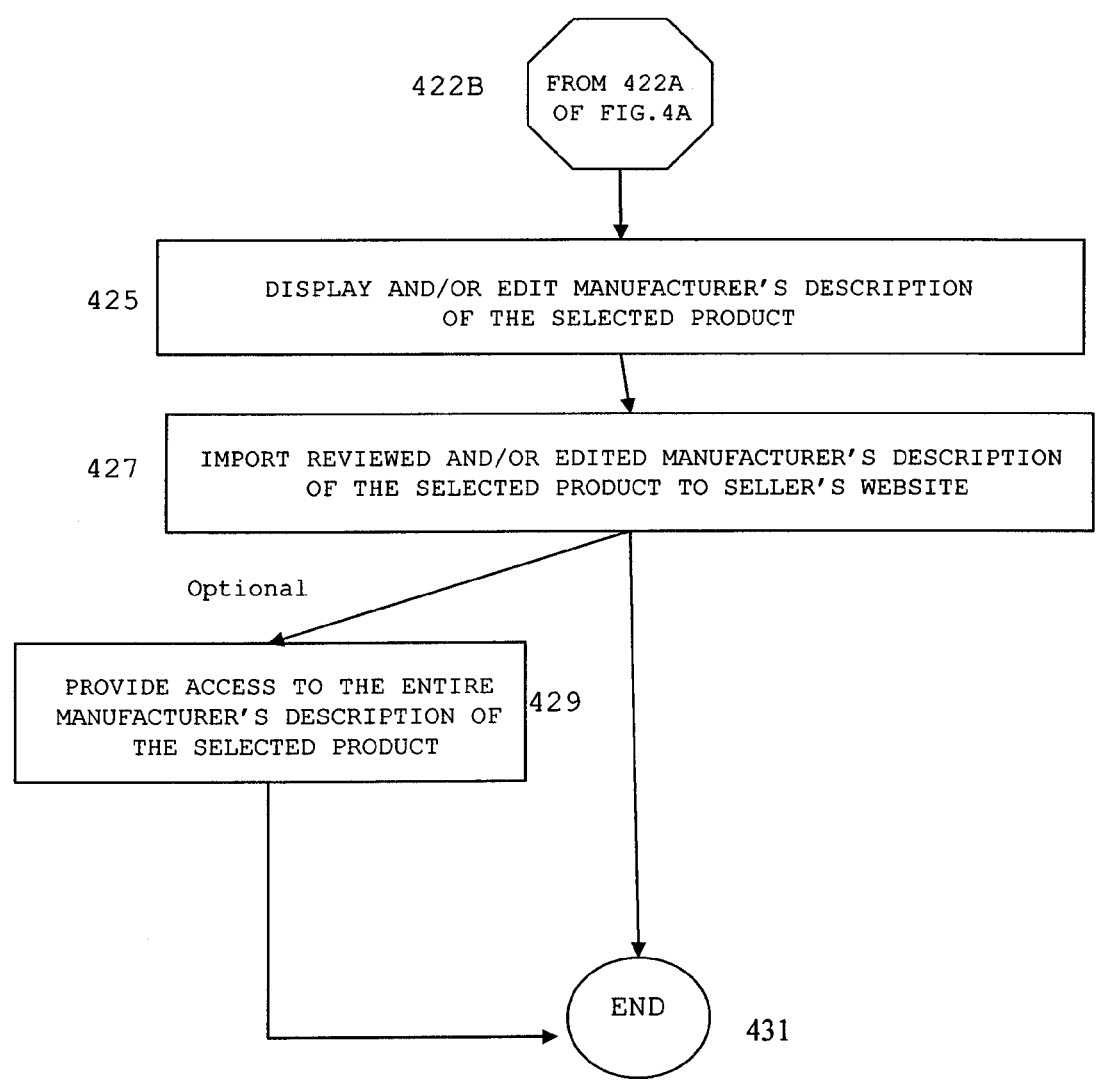

FIG. 4A and FIG. 4B, together, are a flow chart depicting a process for obtaining inventory item descriptions 400 in accordance with one embodiment. Process for obtaining inventory item descriptions 400 begins at ENTER OPERATION 401 and process flow proceeds to PROVIDE A PRODUCT DESCRIPTION DATABASE OPERATION 403.

In one embodiment, PROVIDE A PRODUCT DESCRIPTION DATABASE OPERATION 403; OBTAIN MANUFACTURER'S DESCRIPTION OF A SELECTED PRODUCT OPERATION 405; PROVIDE THE MANUFACTURER'S DESCRIPTION OF THE SELECTED PRODUCT TO THE PRODUCT DESCRIPTION DATABASE OPERATION 407; PROVIDE A SELLER'S WEBSITE LISTING THE SELECTED PRODUCT AS AN INVENTORY ITEM FOR SALE BY THE SELLER OPERATION 409; PROVIDE A COMPUTING SYSTEM IMPLEMENTED FINANCIAL MANAGEMENT SYSTEM USED BY THE SELLER OF THE SELECTED PRODUCT OPERATION 411; ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 413; SEARCH THE PRODUCT DESCRIPTION DATABASE FOR THE MANUFACTURER'S DESCRIPTION OF THE SELECTED PRODUCT USING THE MAPPED MANUFACTURER IDENTIFICATION DATA FOR THE SELECTED PRODUCT OPERATION 415; FIND THE MANUFACTURER'S DESCRIPTION OF THE SELECTED PRODUCT USING THE MAPPED MANUFACTURER IDENTIFICATION DATA FOR THE SELECTED PRODUCT OPERATION 417; and TRANSFER THE MANUFACTURER'S DESCRIPTION OF THE SELECTED PRODUCT TO THE SELLER FOR USE AS THE PRODUCT DESCRIPTION ON THE SELLER'S WEBSITE OPERATION 419 of process for obtaining inventory item descriptions 400 of FIG. 4A are substantially identical to similarly identified and numbered operations: PROVIDE A PRODUCT DESCRIPTION DATABASE OPERATION 203; OBTAIN MANUFACTURER'S DESCRIPTION OF A SELECTED PRODUCT OPERATION 205; PROVIDE THE MANUFACTURER'S DESCRIPTION OF THE SELECTED PRODUCT TO THE PRODUCT DESCRIPTION DATABASE OPERATION 207; PROVIDE A SELLER'S WEBSITE LISTING THE SELECTED PRODUCT AS AN INVENTORY ITEM FOR SALE BY THE SELLER OPERATION 209; PROVIDE A COMPUTING SYSTEM IMPLEMENTED FINANCIAL MANAGEMENT SYSTEM USED BY THE SELLER OF THE SELECTED PRODUCT OPERATION 211; ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT OPERATION 213; SEARCH THE PRODUCT DESCRIPTION DATABASE FOR THE MANUFACTURER'S DESCRIPTION OF THE SELECTED PRODUCT USING THE MAPPED MANUFACTURER IDENTIFICATION DATA FOR THE SELECTED PRODUCT OPERATION 215; FIND THE MANUFACTURER'S DESCRIPTION OF THE SELECTED PRODUCT USING THE MAPPED MANUFACTURER IDENTIFICATION DATA FOR THE SELECTED PRODUCT OPERATION 217; and TRANSFER THE MANUFACTURER'S DESCRIPTION OF THE SELECTED PRODUCT TO THE SELLER FOR USE AS THE PRODUCT DESCRIPTION ON THE SELLER'S WEBSITE OPERATION 219 of process for obtaining inventory item descriptions 200 of FIG. 2. Consequently, the discussion above with respect to: PROVIDE A PRODUCT DESCRIPTION DATABASE OPERATION 203; OBTAIN MANUFACTURER'S DESCRIPTION OF A SELECTED PRODUCT OPERATION 205; PROVIDE THE MANUFACTURER'S DESCRIPTION OF THE SELECTED PRODUCT TO THE PRODUCT DESCRIPTION DATABASE OPERATION 207; PROVIDE A SELLER'S WEBSITE LISTING THE SELECTED PRODUCT AS AN INVENTORY ITEM FOR SALE BY THE SELLER OPERATION 209; PROVIDE A COMPUTING SYSTEM IMPLEMENTED FINANCIAL MANAGEMENT SYSTEM USED BY THE SELLER OF THE SELECTED PRODUCT OPERATION 211; ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 213; SEARCH THE PRODUCT DESCRIPTION DATABASE FOR THE MANUFACTURER'S DESCRIPTION OF THE SELECTED PRODUCT USING THE MAPPED MANUFACTURER IDENTIFICATION DATA FOR THE SELECTED PRODUCT OPERATION 215; FIND THE MANUFACTURER'S DESCRIPTION OF THE SELECTED PRODUCT USING THE MAPPED MANUFACTURER IDENTIFICATION DATA FOR THE SELECTED PRODUCT OPERATION 217; and TRANSFER THE MANUFACTURER'S DESCRIPTION OF THE SELECTED PRODUCT TO THE SELLER FOR USE AS THE PRODUCT DESCRIPTION ON THE SELLER'S WEBSITE OPERATION 219 of process for obtaining inventory item descriptions 200 of FIG. 2 is applicable to, and incorporated here for, similarly identified and numbered operations: PROVIDE A PRODUCT DESCRIPTION DATABASE OPERATION 403; OBTAIN MANUFACTURER'S DESCRIPTION OF A SELECTED PRODUCT OPERATION 405; PROVIDE THE MANUFACTURER'S DESCRIPTION OF THE SELECTED PRODUCT TO THE PRODUCT DESCRIPTION DATABASE OPERATION 407; PROVIDE A SELLER'S WEBSITE LISTING THE SELECTED PRODUCT AS AN INVENTORY ITEM FOR SALE BY THE SELLER OPERATION 409; PROVIDE A COMPUTING SYSTEM IMPLEMENTED FINANCIAL MANAGEMENT SYSTEM USED BY THE SELLER OF THE SELECTED PRODUCT OPERATION 411; ACCESS THE SELLER'S COMPUTING SYSTEM IMPLEMENTED FINANCIAL MANAGEMENT SYSTEM DATA AND OBTAIN A MAPPING BETWEEN THE SELLER'S IDENTIFICATION DATA FOR THE SELECTED PRODUCT AND THE MANUFACTURER'S IDENTIFICATION DATA FOR THE SELECTED PRODUCT OPERATION 413; SEARCH THE PRODUCT DESCRIPTION DATABASE FOR THE MANUFACTURER'S DESCRIPTION OF THE SELECTED PRODUCT USING THE MAPPED MANUFACTURER IDENTIFICATION DATA FOR THE SELECTED PRODUCT OPERATION 415; FIND THE MANUFACTURER'S DESCRIPTION OF THE SELECTED PRODUCT USING THE MAPPED MANUFACTURER IDENTIFICATION DATA FOR THE SELECTED PRODUCT OPERATION 417; and TRANSFER THE MANUFACTURER'S DESCRIPTION OF THE SELECTED PRODUCT TO THE SELLER FOR USE AS THE PRODUCT DESCRIPTION ON THE SELLER'S WEBSITE OPERATION 419 of process for obtaining inventory item descriptions 400 of FIG. 4A.

In one embodiment, once the manufacturer's description of the product is transferred to the seller at TRANSFER THE MANUFACTURER'S DESCRIPTION OF THE SELECTED PRODUCT TO THE SELLER FOR USE AS THE PRODUCT DESCRIPTION ON THE SELLER'S WEBSITE OPERATION 419, the seller's identification, and/or website data, and/or location, and/or phone number, and/or other contact data is forwarded to the manufacturer so the manufacturer can list, or update, the seller's information in a retailers or "where-to-buy" listing section of the manufacturer's website. In one embodiment, the seller's contact data is transferred to the manufacturer's website using any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing and/or discussed herein, or as thereafter developed.

In one embodiment, once the manufacturer's description of the product is transferred to the seller at TRANSFER THE MANUFACTURER'S DESCRIPTION OF THE SELECTED PRODUCT TO THE SELLER FOR USE AS THE PRODUCT DESCRIPTION ON THE SELLER'S WEBSITE OPERATION 419, process flow proceeds through TO 422B OF FIG. 4B OPERATION 422A of FIG. 4A to FROM 422A OF FIG. 4A OPERATION 422B of FIG. 4B to DISPLAY AND/OR EDIT MANUFACTURER'S DESCRIPTION OF THE SELECTED PRODUCT OPERATION 425 of FIG. 4B.

In one embodiment, at DISPLAY AND/OR EDIT MANUFACTURER'S DESCRIPTION OF THE SELECTED PRODUCT OPERATION 425 the seller is provided an opportunity to review and/or edit the manufacturer's description of the product at DISPLAY AND/OR EDIT MANUFACTURER'S DESCRIPTION OF THE SELECTED PRODUCT OPERATION 425.

In one embodiment, the manufacturer's description of the product is displayed to the seller at DISPLAY AND/OR EDIT MANUFACTURER'S DESCRIPTION OF THE SELECTED PRODUCT OPERATION 425 on a display device, such as display devices 115, 165 and/or 125 of computing systems 100, 150 and/or server system 120 of FIG. 1 or through a printer, such as printers 109, 159 of FIG. 1. In one embodiment, the seller can edit the manufacturer's description of the product and/or choose to import all, part of, or none of the manufacturer's description of the product at DISPLAY AND/OR EDIT MANUFACTURER'S DESCRIPTION OF THE SELECTED PRODUCT OPERATION 425 through a user interface device, such as a keyboard, mouse, touchpad, voice recognition software, or any other device and/or system capable of providing user input to a computing system and/or for translating user actions into computing system operations, whether available or known at the time of filing or as developed later, such as keyboards 107, 157, and/or mice 111, 161 of FIG. 1.

Returning to FIG. 4B, in one embodiment, once the seller is provided an opportunity to review and/or edit the manufacturer's description of the product at DISPLAY AND/OR EDIT MANUFACTURER'S DESCRIPTION OF THE SELECTED PRODUCT OPERATION 425, process flow proceeds to IMPORT REVIEWED AND/OR EDITED MANUFACTURER'S DESCRIPTION OF THE SELECTED PRODUCT TO SELLER'S WEBSITE OPERATION 427.

In one embodiment, at IMPORT REVIEWED AND/OR EDITED MANUFACTURER'S DESCRIPTION OF THE SELECTED PRODUCT TO SELLER'S WEBSITE OPERATION 427, the seller chooses to import all, part of, or none of, the manufacturer's description of the product to the seller's website and all, or part of, the data representing the manufacturer's description of the selected product is processed and/or used by process for obtaining inventory item descriptions 400 automatically, or semi-automatically, to populate the product description field of the seller's website for the selected product.

In one embodiment, once the manufacturer's description of the selected inventory item found at FIND THE MANUFACTURER'S DESCRIPTION OF THE SELECTED PRODUCT USING THE MAPPED MANUFACTURER IDENTIFICATION DATA FOR THE SELECTED PRODUCT OPERATION 417 is used to automatically, or semi-automatically, populate the product description field of the seller's website for the selected product with a manufacturer's description of the selected product at IMPORT REVIEWED AND/OR EDITED MANUFACTURER'S DESCRIPTION OF THE SELECTED PRODUCT TO SELLER'S WEBSITE OPERATION 427 process flow proceeds to END OPERATION 431 and process for obtaining inventory item descriptions 400 is exited.

As discussed above, in one embodiment, only part of the manufacturer's description of the selected product is used to automatically, or semi-automatically, populate the product description field of the seller's website for the selected product at IMPORT REVIEWED AND/OR EDITED MANUFACTURER'S DESCRIPTION OF THE SELECTED PRODUCT TO SELLER'S WEBSITE OPERATION 427. In this case, one embodiment of process for obtaining inventory item descriptions 400 includes optional operation PROVIDE ACCESS TO THE ENTIRE MANUFACTURER'S DESCRIPTION OF THE SELECTED PRODUCT OPERATION 429.

In one embodiment, at PROVIDE ACCESS TO THE ENTIRE MANUFACTURER'S DESCRIPTION OF THE SELECTED PRODUCT OPERATION 429 if the seller chooses to use only part of the manufacturer's description of the product, a link is provided on the seller's website of PROVIDE A SELLER'S WEBSITE LISTING THE SELECTED PRODUCT AS AN INVENTORY ITEM FOR SALE BY THE SELLER OPERATION 409 that, when activated, links the user to the full description of the product on either the product description database of PROVIDE A PRODUCT DESCRIPTION DATABASE OPERATION 203 or the manufacturer's website.

Methods, means, and mechanisms for providing links between websites and/or databases are well known to those of skill in the art. Consequently, a more detailed discussion of the methods, means, and mechanisms for providing a link to the entire manufacturer's product description is omitted here to avoid detracting from the invention.

In one embodiment, if the seller chooses to use only part of the manufacturer's description of the product, the full description of the product is provided on the seller's website listing of the product at PROVIDE ACCESS TO THE ENTIRE MANUFACTURER'S DESCRIPTION OF THE SELECTED PRODUCT OPERATION 429 as a PDF or similar downloadable and/or viewable document.

In one embodiment, once seller provides access to the entire manufacturer's product description at PROVIDE ACCESS TO THE ENTIRE MANUFACTURER'S DESCRIPTION OF THE SELECTED PRODUCT OPERATION 429, process flow proceeds to END OPERATION 431 and process for obtaining inventory item descriptions 400 is exited.

As discussed above, using the processes for obtaining inventory item descriptions disclosed herein, such as processes for obtaining inventory item descriptions 200, 300, 400, a seller can easily, and automatically, access a manufacturer description of a selected product in the seller's inventory, including photographs and video, for use as the description on the seller's website of the product and/or in the seller's computing system implemented financial management system. Consequently, using the method and apparatus for obtaining inventory item descriptions, and process for obtaining inventory item descriptions, disclosed herein, the seller is directly benefited by gaining access to often higher quality descriptions, photographs and video, of their inventory items/products, with little of no effort on the seller's part. At the same time, the product manufacturer is given the opportunity to widely, and uniformly, market their product and distribute descriptions and product data that are well produced, professional and consistent, and that the manufacturer feels will showcase their product in the most favorable terms.

In addition, in one embodiment, the seller's identification, and/or website data, and/or location, and/or phone number, and/or other contact data is forwarded to the manufacturer so the manufacturer can list, or update, the seller's information in a retailers or "where-to-buy" listing section of the manufacturer's website. This, in turn, benefits both the seller and the manufacturer by supplying more potential customers for the product.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components and/or operations described herein is merely exemplary, and not mandatory or significant. Consequently, functions performed by a single component and/or operation may, in other embodiments, be performed by multiple components and/or operations, and functions performed by multiple components and/or operations may, in other embodiments, be performed by a single component and/or operation.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing", "providing", "obtaining", "storing", "searching", "matching", "selecting", "transferring", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter.
Accordingly, the disclosure of the present invention is intended to be illustrative, but not limiting, of the scope of the invention, which is set forth in the claims below.

In addition, the operations shown in the FIG.s for the methods and apparatuses and/or processes or applications discussed herein, are identified using a particular nomenclature for ease of description and understanding, but other nomenclature is often used in the art to identify equivalent operations.

In addition, the order of operations depicted in the FIG.s and discussed above was chosen for merely illustrative purposes. Those of skill in the art will readily recognize that different orders of operations can be implemented without departing from the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for obtaining inventory item descriptions comprising:
    providing a product description database;
    obtaining data representing a manufacturer's description of a selected product and the manufacturer's identification data for the selected product;

storing the data representing the manufacturer's description of the selected product and the manufacturer's identification data for the selected product in the product description database;

mapping, using a computing system implemented financial management system used by a seller of the selected product, the seller's identification data for the selected product to the manufacturer's identification data for the selected product, the seller's identification data including at least one of a seller inventory number, a seller catalog number, and a seller product number;

locating, within the product description database, the manufacturer's description of the selected product using the mapped seller's identification data for the selected product;

receiving data representing the manufacturer's description of the selected product at a seller computing system;

displaying the received manufacturer's description of the product for the seller, and receiving user input editing the received manufacturer's description of the product resulting in an edited description;

using, by the seller, the edited description in selling the product.

2. The computing system implemented process for obtaining inventory item descriptions of claim 1, wherein:
the manufacturer's description of the selected product comprises one or more textual descriptions of the selected product.

3. The computing system implemented process for obtaining inventory item descriptions of claim 1, wherein:
the manufacturer's description of the selected product comprises one or more photographic images of the selected product.

4. The computing system implemented process for obtaining inventory item descriptions of claim 1, wherein:
the manufacturer's description of the selected product comprises one or more video images of the selected product.

5. The computing system implemented process for obtaining inventory item descriptions of claim 1, wherein:
the manufacturer's description of the selected product comprises one or more audio descriptions of the selected product.

6. The computing system implemented process for obtaining inventory item descriptions of claim 1, wherein:
the computing system implemented financial management system is a computing system implemented inventory management system.

7. The computing system implemented process for obtaining inventory item descriptions of claim 1, wherein:
the computing system implemented financial management system is a computing system implemented point of sale management system.

8. The computing system implemented process for obtaining inventory item descriptions of claim 1, wherein:
the product description database is a normalized database associated with a search engine system.

9. The computing system implemented process for obtaining inventory item descriptions of claim 1, wherein:
the data representing the manufacturer's description of the selected product and the manufacturer's identification data for the selected product is obtained by the manufacturer of the selected product providing the data representing the manufacturer's description of the selected product and the manufacturer's identification data for the selected product to the product description database.

10. The computing system implemented process for obtaining inventory item descriptions of claim 1, wherein:
the data representing the manufacturer's description of the selected product and the manufacturer's identification data for the selected product is obtained by a search engine.

11. The computing system implemented process for obtaining inventory item descriptions of claim 1, wherein:
providing access to the computing system implemented financial management system data of the computing system implemented financial management system used by the seller of the selected product comprises the seller transferring the computing system implemented financial management system data to the process for obtaining inventory item descriptions.

12. The computing system implemented process for obtaining inventory item descriptions of claim 1, wherein:
providing access to the computing system implemented financial management system data of the computing system implemented financial management system used by the seller of the selected product comprises the seller providing the process for obtaining inventory item descriptions access to a database comprising the computing system implemented financial management system data.

13. The computing system implemented process for obtaining inventory item descriptions of claim 1, wherein:
providing access to the computing system implemented financial management system data of the computing system implemented financial management system used by the seller of the selected product comprises the seller providing the process for obtaining inventory item descriptions access to a computing system implementing the computing system implemented financial management system.

14. The computing system implemented process for obtaining inventory item descriptions of claim 1, further comprising:
providing a seller's website, the seller's website comprising a listing of the selected product, the listing of the selected product comprising a product description field; and
transferring at least a portion of the data representing the manufacturer's description of the selected product to the product description field of the listing of the selected product on the seller's website.

15. The computing system implemented process for obtaining inventory item descriptions of claim 14, wherein:
providing access to the computing system implemented financial management system data of the computing system implemented financial management system used by the seller of the selected product comprises the seller uploading the computing system implemented financial management system data to the seller's website and the seller providing the process for obtaining inventory item descriptions access to the seller's website.

16. A system for obtaining inventory item descriptions comprising:
a computing system;
a product description database; and
a processor for executing a process for obtaining inventory item descriptions, the process for obtaining inventory item descriptions comprising:
obtaining data representing a manufacturer's description of a selected product and the manufacturer's identification data for the selected product;

storing the data representing the manufacturer's description of the selected product and the manufacturer's identification data for the selected product in the product description database;

mapping, using a computing system implemented financial management system used by a seller of the selected product, the seller's identification data for the selected product to the manufacturer's identification data for the selected product, the seller's identification data including at least one of a seller inventory number, a seller catalog number, and a seller product number;

locating, within the product description database, the manufacturer's description of the selected product using the mapped seller's identification data for the selected product;

receiving data representing the manufacturer's description of the selected product at a seller computing system;

displaying the received manufacturer's description of the product for the seller, and receiving user input editing the received manufacturer's description of the product resulting in an edited description;

using, by the seller, the edited description in selling the product.

17. The computing system implemented process for obtaining inventory item descriptions of claim 16, wherein:
the manufacturer's description of the selected product comprises one or more textual descriptions of the selected product.

18. The system for obtaining inventory item descriptions of claim 16, wherein:
the manufacturer's description of the selected product comprises one or more photographic images of the selected product.

19. The system for obtaining inventory item descriptions of claim 16, wherein:
the manufacturer's description of the selected product comprises one or more video images of the selected product.

20. The system for obtaining inventory item descriptions of claim 16, wherein:
the manufacturer's description of the selected product comprises one or more audio descriptions of the selected product.

21. The system for obtaining inventory item descriptions of claim 16, wherein:
the computing system implemented financial management system is a computing system implemented inventory management system.

22. The system for obtaining inventory item descriptions of claim 16, wherein:
the computing system implemented financial management system is a computing system implemented point of sale management system.

23. The system for obtaining inventory item descriptions of claim 16, wherein:
the product description database is a normalized database associated with a search engine system.

24. The system for obtaining inventory item descriptions of claim 16, wherein:
the data representing the manufacturer's description of the selected product and the manufacturer's identification data for the selected product is obtained by the manufacturer of the selected product providing the data representing the manufacturer's description of the selected product and the manufacturer's identification data for the selected product to the product description database.

25. The system for obtaining inventory item descriptions of claim 16, wherein:
the data representing the manufacturer's description of the selected product and the manufacturer's identification data for the selected product is obtained by a search engine.

26. The system for obtaining inventory item descriptions of claim 16, wherein:
providing access to the computing system implemented financial management system data of the computing system implemented financial management system used by the seller of the selected product comprises the seller transferring the computing system implemented financial management system data to the process for obtaining inventory item descriptions.

27. The system for obtaining inventory item descriptions of claim 16, wherein:
providing access to the computing system implemented financial management system data of the computing system implemented financial management system used by the seller of the selected product comprises the seller providing the process for obtaining inventory item descriptions access to a database comprising the computing system implemented financial management system data.

28. The system for obtaining inventory item descriptions of claim 16, wherein:
providing access to the computing system implemented financial management system data of the computing system implemented financial management system used by the seller of the selected product comprises the seller providing the process for obtaining inventory item descriptions access to a computing system implementing the computing system implemented financial management system.

29. The system for obtaining inventory item descriptions of claim 16, wherein:
the process for obtaining inventory item descriptions further comprises:
providing a seller's website, the seller's website comprising a listing of the selected product, the listing of the selected product comprising a product description field; and
transferring at least a portion of the data representing the manufacturer's description of the selected product to the product description field of the listing of the selected product on the seller's website.

30. The system for obtaining inventory item descriptions of claim 29, wherein:
providing access to the computing system implemented financial management system data of the computing system implemented financial management system used by the seller of the selected product comprises the seller uploading the computing system implemented financial management system data to the seller's website and the seller providing the process for obtaining inventory item descriptions access to the seller's website.

31. A computer program product for obtaining inventory item descriptions comprising:
a nontransitory computer readable medium;
and computer program code, encoded on the computer readable medium, comprising computer readable instructions for:
obtaining data representing a manufacturer's description of a selected product and the manufacturer's identification data for the selected product;

storing the data representing the manufacturer's description of the selected product and the manufacturer's identification data for the selected product in a product description database;

mapping, using a computing system implemented financial management system used by a seller of the selected product, the seller's identification data for the selected product to the manufacturer's identification data for the selected product, the seller's identification data including at least one of a seller inventory number, a seller catalog number, and a seller product number;

locating, within the product description database, the manufacturer's description of the selected product using the mapped seller's identification data for the selected product;

receiving data representing the manufacturer's description of the selected product at a seller computing system;

displaying the received manufacturer's description of the product for the seller, and receiving user input editing the received manufacturer's description of the product resulting in an edited description;

using, by the seller, the edited description in selling the product.

32. The computer program product for obtaining inventory item descriptions of claim 31, wherein:
the manufacturer's description of the selected product comprises one or more textual descriptions of the selected product.

33. The computer program product for obtaining inventory item descriptions of claim 31, wherein:
the manufacturer's description of the selected product comprises one or more photographic images of the selected product.

34. The computer program product for obtaining inventory item descriptions of claim 31, wherein:
the manufacturer's description of the selected product comprises one or more video images of the selected product.

35. The computer program product for obtaining inventory item descriptions of claim 31, wherein:
the manufacturer's description of the selected product comprises one or more audio descriptions of the selected product.

36. The computer program product for obtaining inventory item descriptions of claim 31, wherein:
the computing system implemented financial management system is a computing system implemented inventory management system.

37. The computer program product for obtaining inventory item descriptions of claim 31, wherein:
the computing system implemented financial management system is a computing system implemented point of sale management system.

38. The computer program product for obtaining inventory item descriptions of claim 31, wherein:
the product description database is a normalized database associated with a search engine system.

39. The computer program product for obtaining inventory item descriptions of claim 31, wherein:
the data representing the manufacturer's description of the selected product and the manufacturer's identification data for the selected product is obtained by the manufacturer of the selected product providing the data representing the manufacturer's description of the selected product and the manufacturer's identification data for the selected product to the product description database.

40. The computer program product for obtaining inventory item descriptions of claim 31, wherein:
the data representing the manufacturer's description of the selected product and the manufacturer's identification data for the selected product is obtained by a search engine.

41. The computer program product for obtaining inventory item descriptions of claim 31, wherein:
providing access to the computing system implemented financial management system data of the computing system implemented financial management system used by the seller of the selected product comprises the seller transferring the computing system implemented financial management system data to the process for obtaining inventory item descriptions.

42. The computer program product for obtaining inventory item descriptions of claim 31, wherein:
providing access to the computing system implemented financial management system data of the computing system implemented financial management system used by the seller of the selected product comprises the seller providing the process for obtaining inventory item descriptions access to a database comprising the computing system implemented financial management system data.

43. The computer program product for obtaining inventory item descriptions of claim 31, wherein:
providing access to the computing system implemented financial management system data of the computing system implemented financial management system used by the seller of the selected product comprises the seller providing the process for obtaining inventory item descriptions access to a computing system implementing the computing system implemented financial management system.

44. The computer program product for obtaining inventory item descriptions of claim 31, wherein:
the computer program code, encoded on the computer readable medium, further comprises computer readable instructions for:
transferring at least a portion of the data representing the manufacturer's description of the selected product to a product description field of a listing of the selected product on a seller's website.

45. The computer program product for obtaining inventory item descriptions of claim 44, wherein:
providing access to the computing system implemented financial management system data of the computing system implemented financial management system used by the seller of the selected product comprises the seller uploading the computing system implemented financial management system data to the seller's website and the seller providing the process for obtaining inventory item descriptions access to the seller's website.

* * * * *